United States Patent [19]

Williams

[11] Patent Number: 5,652,868
[45] Date of Patent: Jul. 29, 1997

[54] DATA PROCESSOR HAVING BIOS DECRYPTION OF EMULATED MEDIA IMAGES

[75] Inventor: Donald D. Williams, Boca Raton, Fla.

[73] Assignee: International Business Machines Corporation, Armonk, N.Y.

[21] Appl. No.: 312,748

[22] Filed: Sep. 27, 1994

[51] Int. Cl.$^6$ ............... G06F 9/455; H04L 9/00
[52] U.S. Cl. ............... 395/500; 395/701; 380/4; 380/28
[58] Field of Search ............... 395/500, 650, 395/700; 364/DIG. 1; 380/4, 3, 28

[56] References Cited

U.S. PATENT DOCUMENTS

| | | | |
|---|---|---|---|
| 4,780,905 | 10/1988 | Cruts et al. | 380/28 |
| 5,003,597 | 3/1991 | Merkle | 380/28 |
| 5,128,995 | 7/1992 | Arnold et al. | 380/4 |
| 5,193,174 | 3/1993 | Bealkowski et al. | 395/500 |
| 5,210,875 | 5/1993 | Bealkowski et al. | 395/700 |
| 5,230,052 | 7/1993 | Dayan et al. | 395/700 |
| 5,375,169 | 12/1994 | Seheidt et al. | 380/28 |
| 5,388,156 | 2/1995 | Blackledge et al. | 380/4 |
| 5,388,267 | 2/1995 | Chan et al. | 395/700 |
| 5,418,918 | 5/1995 | Vander Kamp et al. | 395/700 |
| 5,432,939 | 7/1995 | Blackledge et al. | 395/700 |
| 5,454,039 | 9/1995 | Coppersmith et al. | 380/28 |
| 5,465,357 | 11/1995 | Bealkowski et al. | 395/700 |

*Primary Examiner*—Kevin J. Teska
*Assistant Examiner*—Tyrone V. Walker
*Attorney, Agent, or Firm*—Bernard D. Bogdon

[57] ABSTRACT

Multiple applications or versions of an application in different languages are distributed on a single mass storage medium, such as a CD-ROM. The BIOS is programmed to emulate different drives individually or simultaneously with data read from prescribed regions of the CD-ROM. To prevent access to unauthorized emulated images, each image is provided with an encryption key used as the seed to a pseudorandom number generator. Pseudorandom decryption of each block of data read from the CD-ROM is performed at the BIOS level only or at both the BIOS and application levels. For enhanced security, the algorithm decrypts each block of encrypted image data at a starting index that is pseudorandomly derived.

4 Claims, 13 Drawing Sheets

DATA PROCESSOR HAVING BIOS DECRYPTION OF EMULATED MEDIA IMAGES

CROSS-REFERENCES TO RELATED APPLICATIONS

The subject matter presented herein relates to inventions described in the following applications, all filed on even date and under common ownership herewith: Williams, BIOS EMULATION OF A HARD FILE IMAGE AS A DISKETTE, U.S. Ser. No. 08/313,709 (BC9-94-130); Williams et al., BIOS DYNAMIC EMULATION OF MULTIPLE DISKETTES FROM A SINGLE MEDIA, U.S. Ser. No. 08/313,710 (BC9-94-131); and Williams et al., BIOS EMULATION PARAMETER PRESERVATION ACROSS COMPUTER BOOTSTRAPPING, U.S. Ser. No. 08/312,749 (BC9-94-129).

BACKGROUND OF THE INVENTION

1. Field of the Invention

This invention relates generally to data processing, and more particularly, to decryption of scrambled data stored in prescribed regions of a mass storage medium, such as a CD-ROM.

2. Description of Related Art

All computers, such as the various models of personal computers, or PC's, produced by IBM, corporation execute "operating system software" that instructs the PC on how to use other programs, termed "application software," such as word processing and spreadsheet programs. Examples of PC operating systems include MS-DOS and WINDOWS, manufactured by Microsoft Corporation, and IBM's OS/2.

Before a PC can run an operating system, it must load the operating system from a disk to the PC's working memory which is ordinarily random access semiconductor memory (RAM). This is carried out through a process known as "bootstrapping," or more simply, "booting" the PC. Booting occurs automatically when the PC is first turned on, a process called a "cold boot," or by the user while the computer is running ("warm boot").

Bootstrapping performs only two functions, the first being to run a power-on self-test, or POST, and the other to search the storage media (floppy diskette or hard disk) for the operating system it will load. These functions are controlled by firmware stored in one or more basic input-output system, or BIOS, chips inside the PC.

The POST initializes all the internal hardware and hardware connected to the PC known to it, such as memory, and tests and places the hardware in an operational state. The BIOS program then normally checks drive A of the PC to determine if it contains a formatted floppy disk. If a disk is mounted in the drive, the program searches specific locations on the disk to determine if a valid boot record exists. If the floppy drive is empty, the boot program checks the hard drive C for the system files. In the absence of these files, the BIOS will generate an error message.

After locating a disk with a valid boot record, the BIOS program reads the data stored on the first sector of the disk, and copies that data to specific locations in RAM. This information, found in the same location on every formatted disk, constitutes the DOS boot record. The BIOS then passes control to the boot record which instructs the PC on how to load the two hidden operating system files to RAM (the files named IBMBIO.COM and IBMDOS.COM on IBM computers). After loading other operating system files into RAM to carry out the rest of the boot up sequence, the boot record is no longer needed.

The root directory of the boot disk is next searched for a file created by the user (CONFIG.SYS) and which contains commands instructing the operating system how to handle certain operations such as how many files may be opened at a time, and so-called device drivers which describe the existence and characteristics of hardware devices not recognized by BIOS that may be connected to the PC.

Next loaded from the boot disk into RAM is the file COMMAND.COM which is an operating system file containing, among other functions, fundamental DOS commands used throughout application program execution, and a file named AUTOEXEC.BAT created by the user and containing a series of DOS batch file commands or program names to be executed by the PC each time the computer is turned on. This completes the boot up sequence, and at this point the computer is considered fully booted and ready to be used.

The usual types of storage media, in order of storage density are floppy disk, hard disk storage, which are magnetic media, and more recently, CD-ROM which is an optical medium capable of storing a considerable amount of data. A CD-ROM is a "read only" medium, although magneto-optical media, capable of being written to as well as read from, are emerging. Presently, floppy disks are 5.25 or 3.5 inches in diameter, with smaller sizes now emerging, and are capable of storing up to 2.88 megabytes of data. Hard disks store considerably more data, currently in the range of up to 2 gigabits, arranged as clusters disbursed throughout the medium.

CD-ROM's have attributes of both hard disks and floppy diskettes, that is, they have the storage capacity of a hard drive and the replaceability of a diskette. CD-ROM technology currently is capable of storing more than 600 megabytes of read-only data along a continuous spiral track on a phonograph record-like optical medium. As with other disk media, the CD divides its capacity into short segments, or "large frames" for addressing. The number of such large frames varies but can reach about 315,000, each containing 2352 bytes under a defined media standard. Most of the frame contains data and the remainder is divided among a synchronization field, sector address tag field and an auxiliary field. Data stored on the CD-ROM is formatted as sectors of data comprising 800 h bytes each, and with boot record residing at a prescribed (11 h) sector in the last session on the CD. The boot record points to a boot catalog providing descriptions and locations of disk or diskette image emulations recorded on the CD-ROM, one or more of which may be bootable and may carry an operating system.

Image formats of these three types of media are hierarchical in structure, with diskette lowest and CD-ROM highest, and each medium adding regions of storage overlying the storage regions of the medium beneath it. Referring to FIG. 1, which depicts the image formats of the three media, a floppy diskette starts with a boot record, which is a short program loading the operating system into the main memory, followed by a pair of file allocation tables (FAT's) which record the file structure of the diskette (two FAT's are often provided, as shown, to perform an integrity check on stored files). Next is a root directory which records the files stored on the diskette, and finally the data storage region.

The structure of a fixed disk includes not only the same regions as found in a diskette, but precedes with a reserved region as well as a partition table which, as the first record on the disk, defines the operating boundaries constituting the logical partitions of the disk, if the disk is partitioned by the user. The hard file may contain multiple "floppy images."

A CD-ROM adds to that a table of descriptors, such as defined by ISO 9660, as the first record on the CD. How data is organized into files stored on a CD-ROM is designated by the ISO 9660 specification, which specifies, among other things, that a "Primary Volume Descriptor" must reside at sector 10 h relative to the start of a session, followed by any number of other Volume Descriptors, and then by a "Volume Descriptor Terminator." The boot catalog, following the ISO descriptors, is a directory pointing to the stored images as files as identifying image characteristics. Incorporation by reference is made herein to the ISO 9660 specification in its entirety. A CD may contain multiple "hard file" and/or "floppy images."

The ISO 9660 specification provides, optionally, new boot capabilities for personal computers, a concept disclosed in the "El Torito" bootable CD-ROM format specification, Version 1.0, recently jointly developed and made publically available by Phoenix Technologies and IBM Corporation, the assignee of the present invention. This specification, incorporated herein by reference, describes how the BIOS boot procedure can be enhanced to support the CD-ROM using INT 13 calling conventions for enabling the CD-ROM to boot as the A drive or C drive without device drivers. In accordance with this specification, if the user selects one of the boot CD-ROM options on a setup menu, and during POST the BIOS detects the presence of a CD-ROM drive, INT 19 at the end of POST will attempt to load the operating system using the boot sequence specified in Setup. To accomplish this, the installable boot CD-ROM feature makes available one of two INT 19 functions, namely, single image and multiple image INT 19.

The single image INT 19 feature accesses the booting catalog in the CD-ROM header, verifies the existence of a boot image on the CD-ROM and reads the initial/default entry and then boots from the disk image specified in this entry. Multiple image INT 19, if instructed to boot from the CD-ROM, accesses the booting catalog, verifies, and then boots from either the image specified in the initial default entry or from one of the other images listed in the section headers and section entries that follow the initial/default entry.

Three types of CD-ROM configuration are shown in FIGS. 2(a)–2(c). In FIG. 2(a), the normal CD-ROM configuration is not bootable; it uses root directory and CD-ROM drivers to access CD-ROM images. In FIG. 2(b), a BIOS with a single boot image capability accesses the initial/default entry to access a single bootable disk image. After loading the operating system, the system can revert to standard CD-ROM drivers and the root directory to access CD-ROM images. In FIG. 3, a BIOS with multiple boot-image capability can access any one of a number of bootable disk images listed in the booting catalog. After loading the operating system, the system can access other items in the disk image with standard INT 13 calls or return to normal access of CD-ROM images using CD-ROM drivers and the root directory.

The operating environment is depicted in FIG. 5, wherein the right hand side is a map of the first 1M of random access main memory. The lowest address of the main memory is occupied by BIOS data, such as interrupt vectors and other machine specific operating parameters such as identification of drives and access to them through BIOS INT 13 functions. The next region of memory is occupied by the operating system, such as DOS, followed by an extended BIOS area, or BIOS EBDA entered during booting. Residing in the upper layers of the main memory are video data and firmware based BIOS which is fixed for all applications. The usual BIOS functions do not recognize a CD-ROM drive, which is instead defined by ISO-9660 device driver software residing in the operating system, as shown in FIG. 5.

In FIG. 6, in accordance with the El Torito specification, enhancements made to BIOS EBDA enable the INT 13 calls to recognize the CD-ROM and further to provide for hard disk and floppy diskette image emulations derived from the CD-ROM storage files, that is, to treat the emulation images as if they are physical drives. In this example, the CD-ROM image which is booted becomes the A (floppy diskette) drive, and the physical A drive is renamed as drive B (A: becomes B; floppy 1. IMB becomes A; DOS and application load from emulated A).

An important advantage of bootable CD-ROM's in accordance with the El Torito specification is the capability of distributing multiple applications on a single medium. Multiple versions of the same application in different languages can also be distributed; the user simply boots the CD-ROM and then selects the operation system, application set, and/or language to install.

However, one problem with this approach is in management of royalties or other distribution control. For example, several environments, such as IBM DOS, MS DOS, Windows, OS/2, AIX and others can be on the same CD-ROM but the user may not have purchased all of them. Some form of protection accordingly is needed to prevent unauthorized access to some parts of the CD-ROM.

SUMMARY OF THE INVENTION

The invention provides a data processing system comprising a central processing unit (CPU), a system memory for storing data in the form of electrical signals, a first port for receiving an input device generating electrical input signals, and at least one second port for supplying electrical output signals to output devices. The CPU is of a type including a BIOS circuit for carrying out prescribed functions including converting operating signals developed by an operating system executed by the CPU into electrical signals compatible with devices that are responsive to signals provided by the CPU to the system bus. The data processing system further includes a drive for a non-volatile mass storage medium storing multiple independent applications in the form of encrypted data on respective BIOS emulated images and a system bus interconnecting the CPU, system memory, first and second ports and mass storage medium driver. In accordance with a principal aspect of the invention, the BIOS circuit is programmed in accordance with a decryption algorithm for decrypting data from only a prescribed emulated image read from the mass storage medium.

Advantageously, the mass storage medium may comprise a CD-ROM. In the preferred embodiment, the CD-ROM is bootable, and each emulated image carries its own operating system.

In accordance with another aspect of the invention, the decryption algorithm comprises:
  (a) reading a block of data from the prescribed region,
  (b) applying an encryption key as a seed to a pseudorandom number generator and generating a first pseudorandom number therefrom of modulus equal to the size of the data block to define a data block starting point of a buffer,
  (c) generating a second pseudorandom number, (d) exclusive ORing the second pseudorandom number with current data at the starting index in the buffer using the first pseudorandom, (e) incrementing the data buffer, wrapping to the buffer start, if necessary, and (f) repeating steps (c), (d) and (e) until block data decryption is complete.

Optionally, the data processing system may include a further decryption algorithm executing at the operating system level for decrypting the data from the corresponding emulated image read from the CD-ROM.

Hence, access to particular applications among a number of stored applications can be restricted only to authorized users, simplifying and making economically feasible the distribution of mass storage media, such as CD-ROMs, having multiple bootable images. In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

BRIEF DESCRIPTION OF THE DRAWING(S)

FIG. 1 is a diagram showing image formats of diskette, hard drive and CD-ROM storage media.

FIGS. 2(a)–2(c) are diagrams showing configurations of non-bootable CD-ROM, single boot image CD-ROM and multiple boot image CD-ROM, respectively.

DESCRIPTION OF THE ILLUSTRATIVE EMBODIMENT(S)

Figure 1:
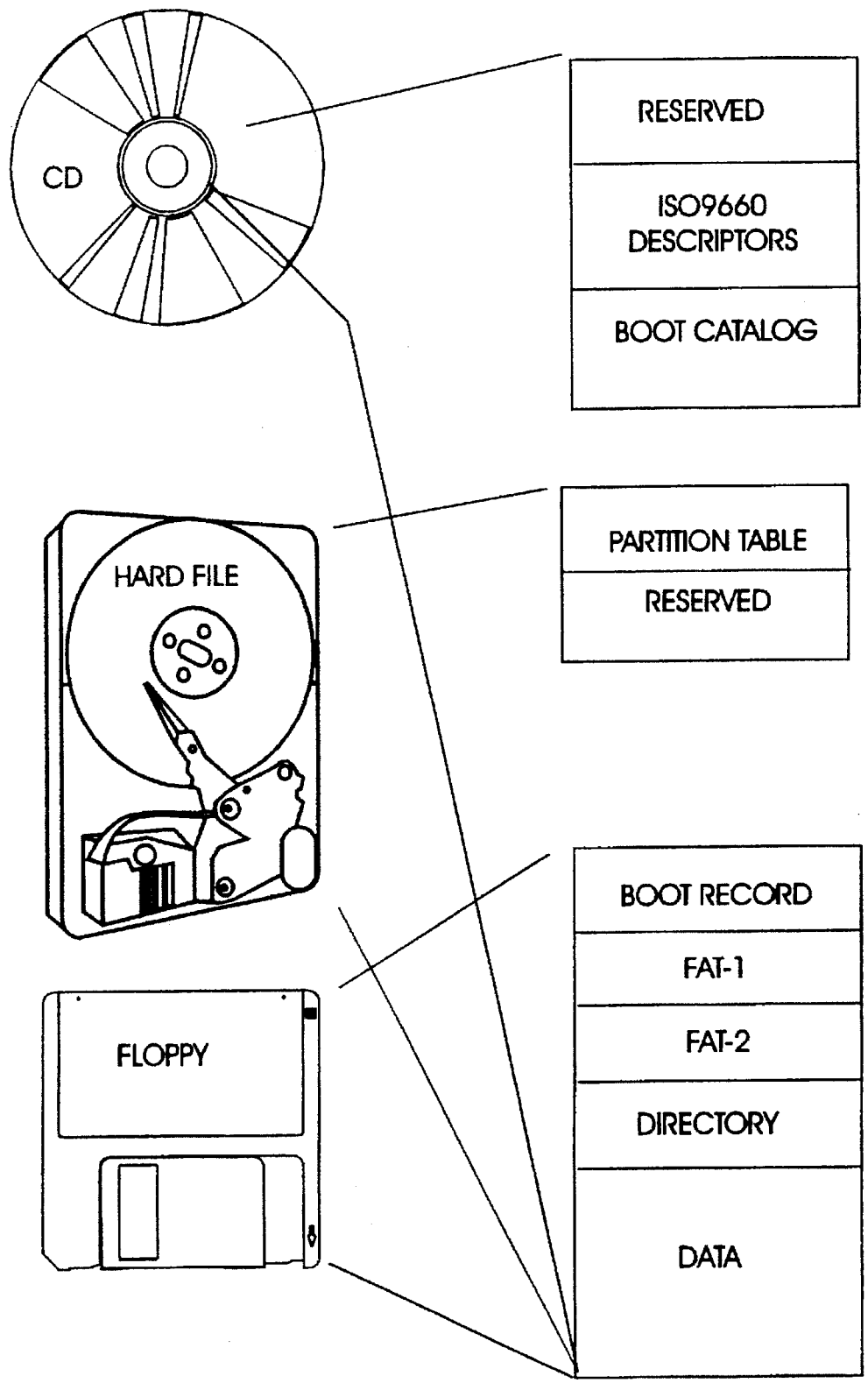
Figure 2:
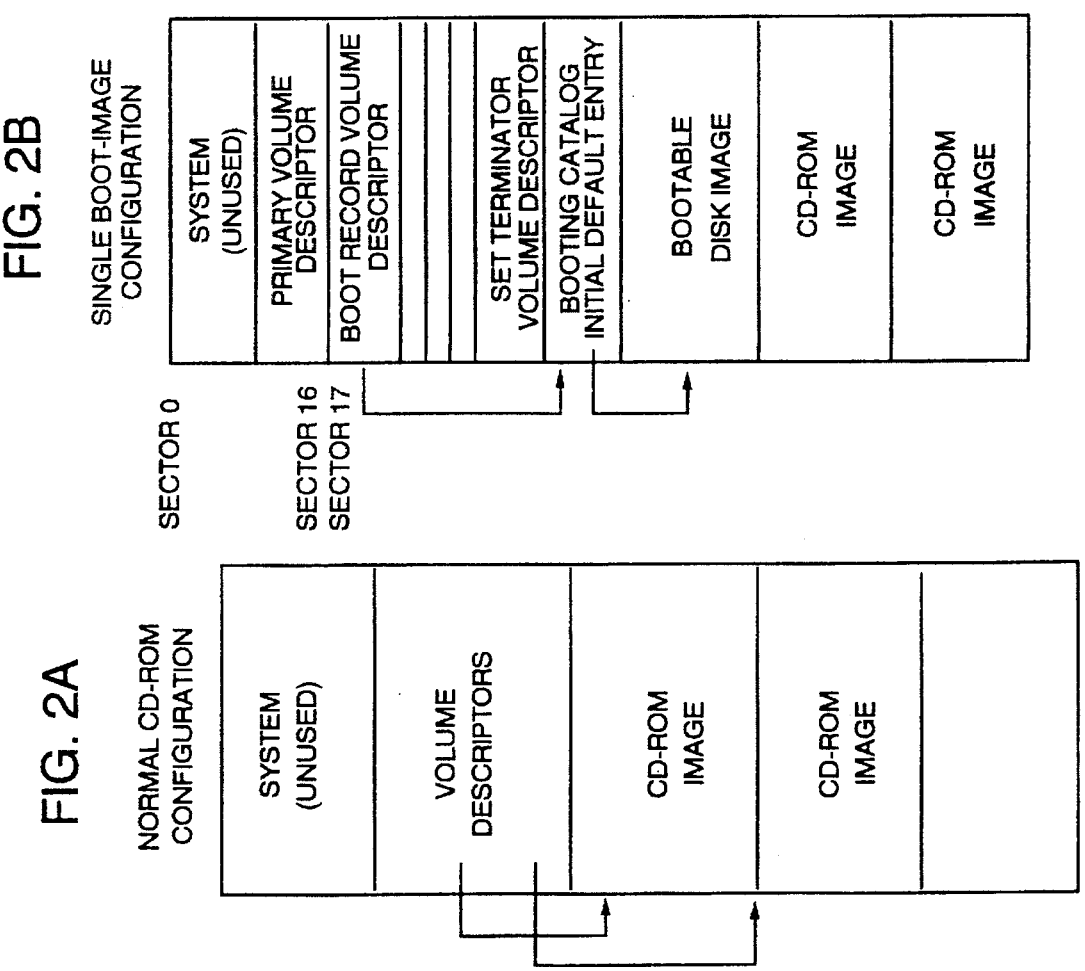
Figure 3:
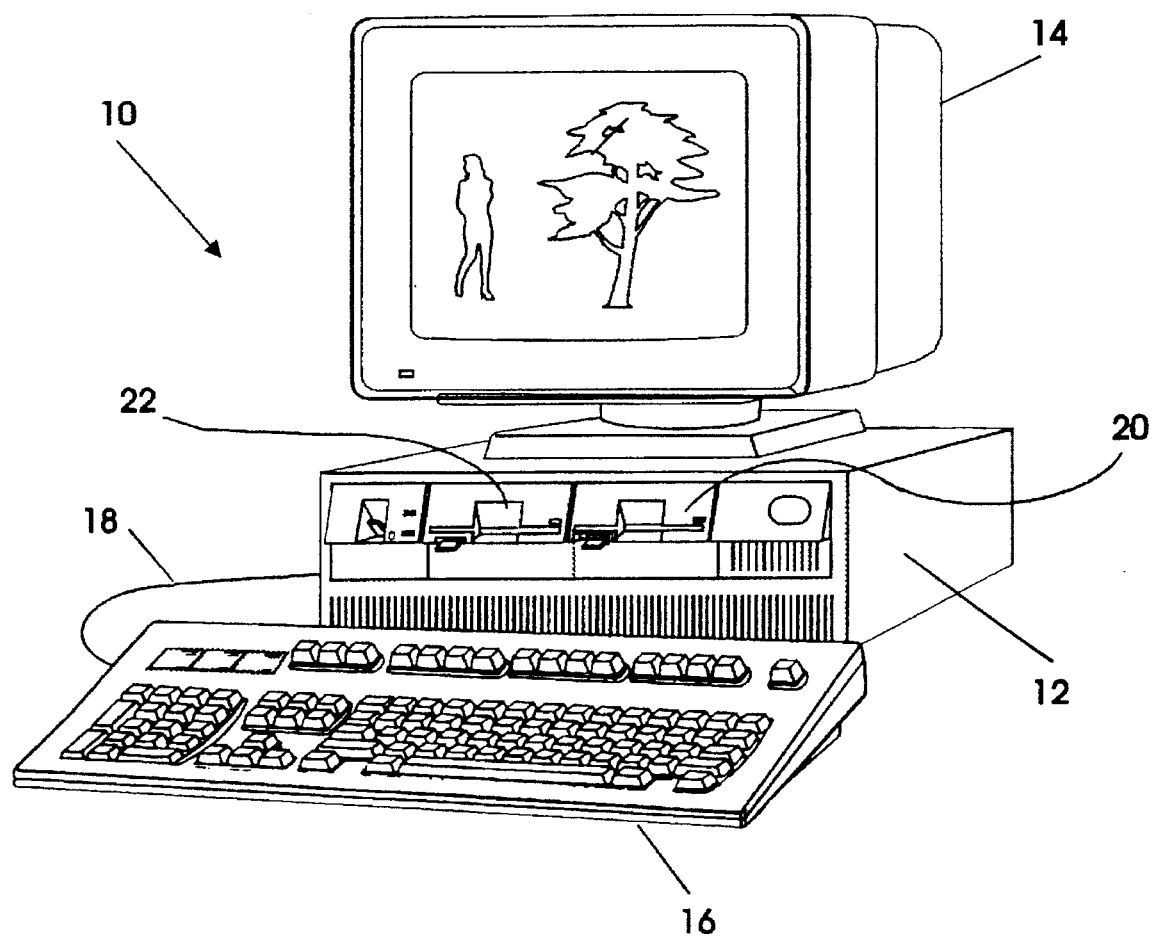
FIG. 3 is a perspective view of a personal computer system within which the present invention has application.

With reference now to the Figures, and in particular with reference to FIG. 3, a personal computer, or PC, designated 10 is of the environment to which the invention has particular utility. The computer 10 which preferably, but not necessarily, is of a type utilizing an IBM Personal Computer 2 or similar system, includes a console housing 12 within which circuit boards containing the necessary circuitry including microprocessor and BIOS chips, controllers, random access memory and other hardware are arranged. The computer will also include a video display 14 and a keyboard 16 connected into the housing 12 through cable 18. Mass storage media include a hard drive within the housing and not accessible to the user, and user accessible floppy disk and CD-ROM drives 20 and 22.

Figure 4:
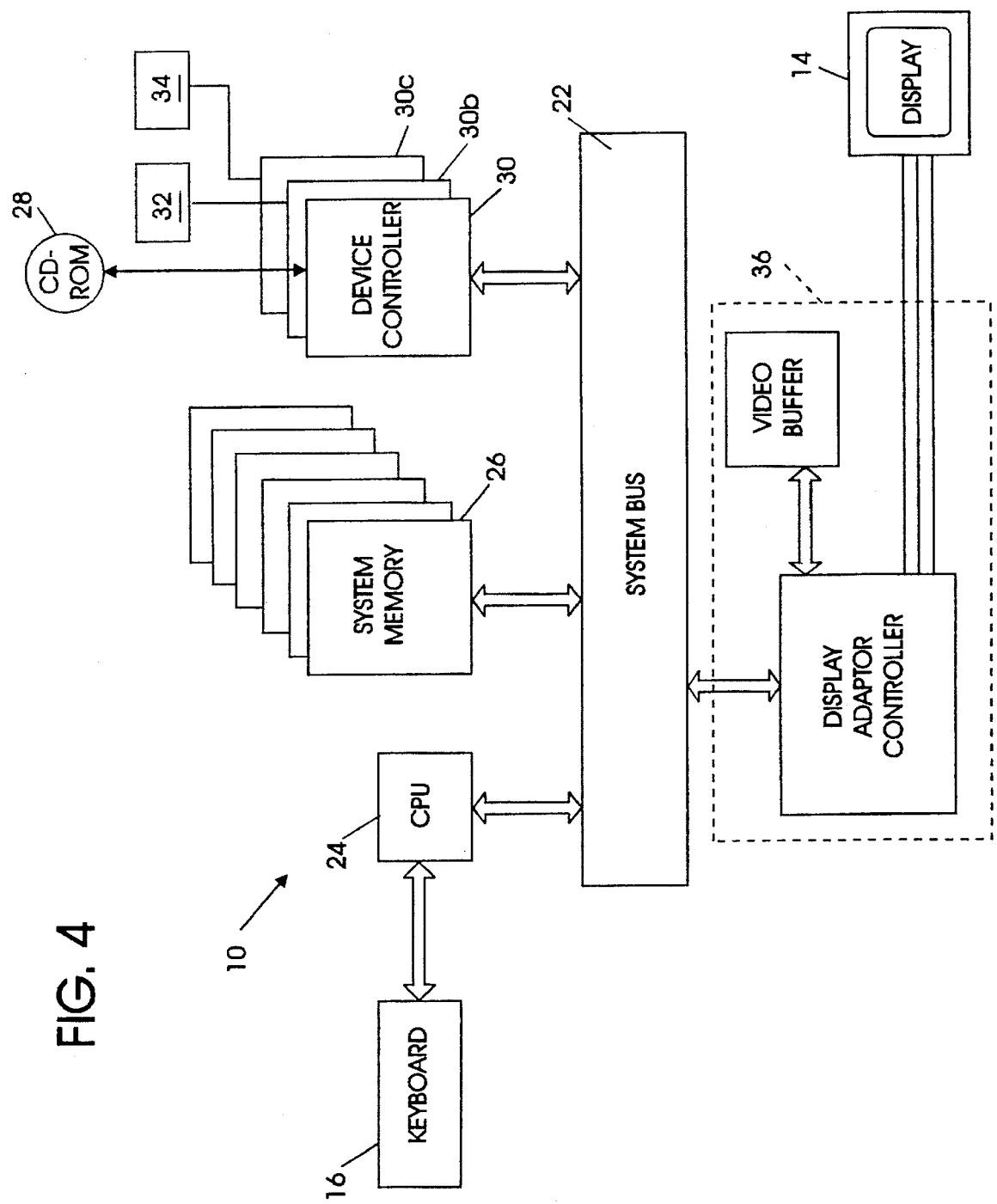
FIG. 4 is a block diagram of a personal computer based data processing system within which the invention may reside.
Figure 5:
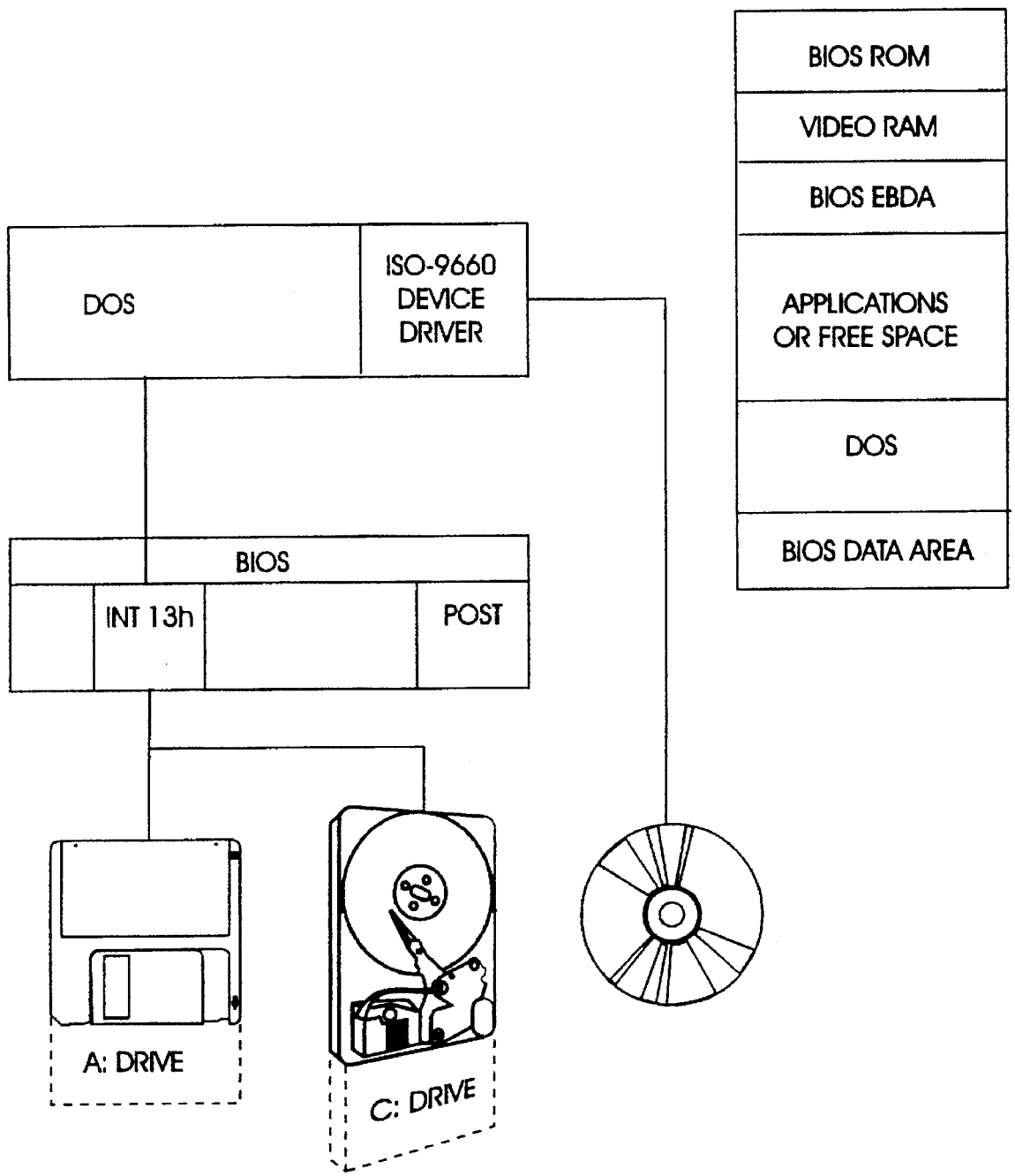
FIG. 5 is a diagram of the ISO-9660 operating environment upon which the invention is optionally based.
Figure 6:
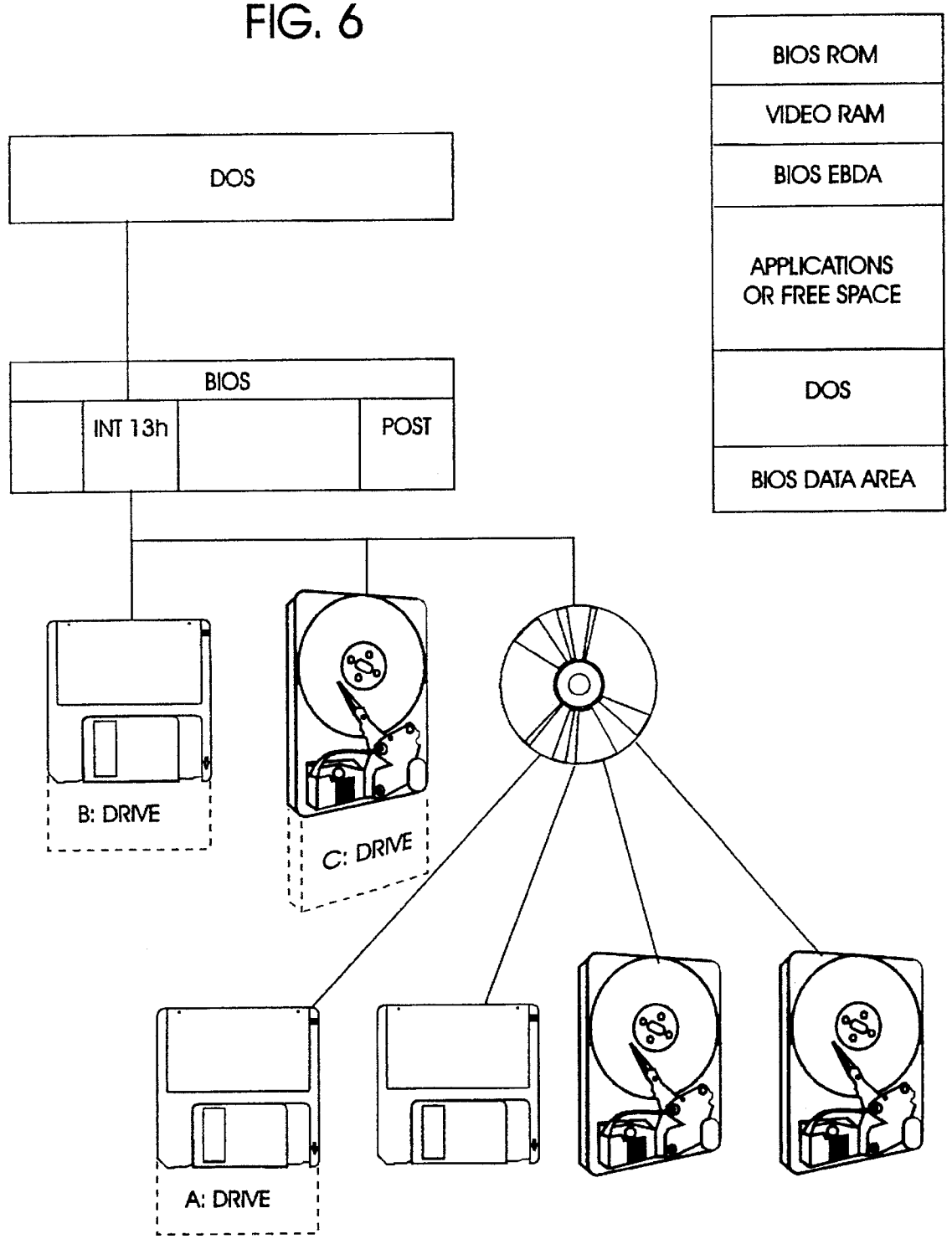
FIG. 6 is a default CD boot diagram showing BIOS implementation of multiple CD-ROM image emulation per the El Torito specification.

The architecture of computer system 10, depicted in FIG. 4, is based on a system bus 22 on which data is passed between components of the computer, including a central processing unit (CPU) 24 which preferably is based on one of the "486" family or more powerful types of processors, manufactured by Intel corporation or others, executes programs stored in main or system memory 26 and manipulates data stored in the same memory. Data, including multimedia, may be stored in CD-ROM 28 and accessed by CPU 24 per ISO 9660 specifications through a device controller 30 connected to system bus 22. Other data are stored in floppy and hard disk drives 32 and 34 for access by the CPU 24 through corresponding controllers 30b and 30c. Display 14 is connected to the system bus 22 through a video controller 36.

The bootable CD-ROM format incorporated by the invention maintains compatibility with ISO-9660 while providing BIOS with a means of finding the location on the CD that contains the material to be booted. The format is detailed in an appendix hereto (APPENDIX).

Figure 7:
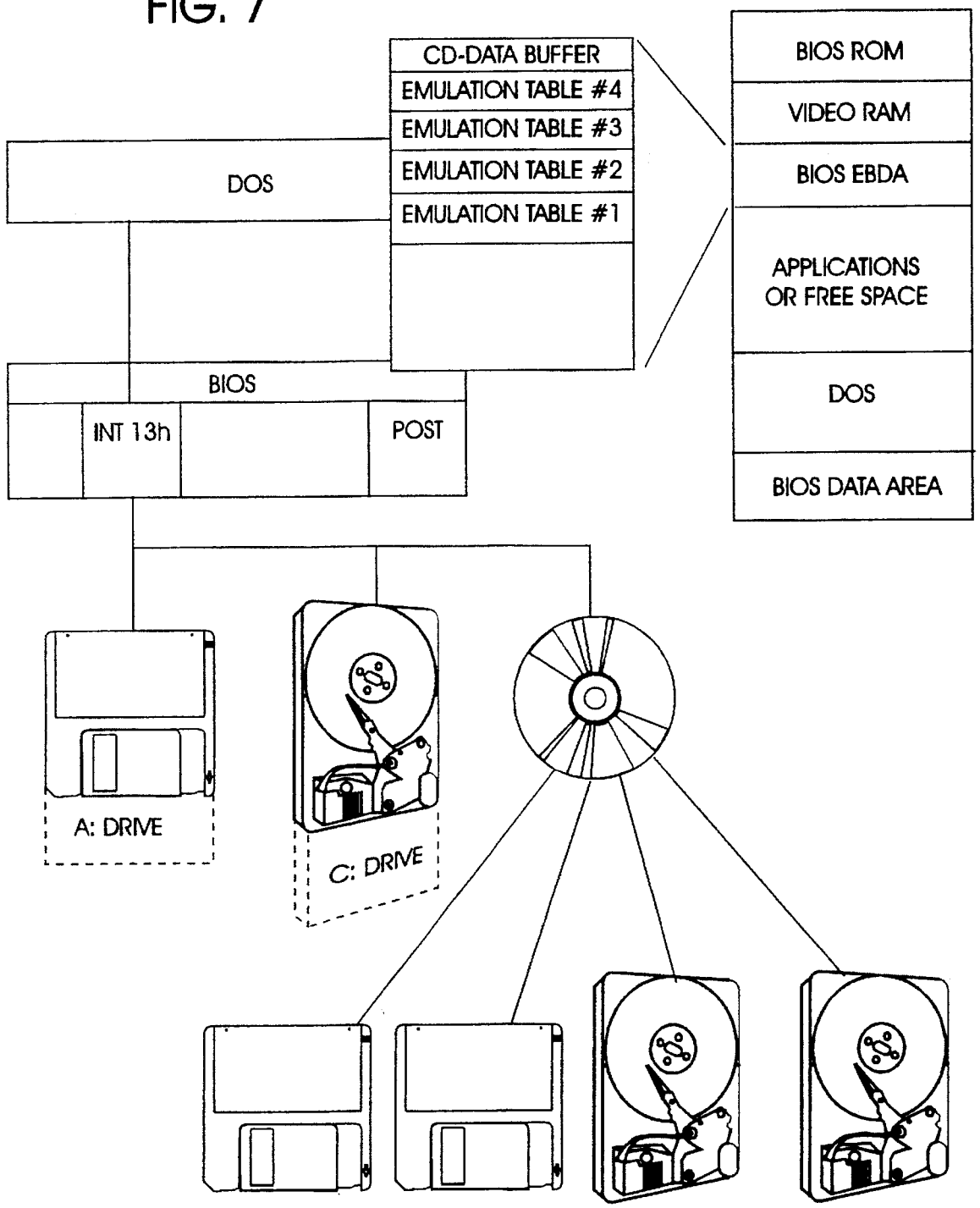
FIG. 7 is a diagram showing multiple emulation tables residing in BIOS EBDA in accordance with an aspect of the invention.

Preferably, the CD-ROM is bootable, as described previously, and in the invention is formatted in accordance with the El Torito bootable CD-ROM format specification. With reference to FIG. 7, multiple emulation CD-ROM images are made available to the user through multiple emulation tables added in accordance with an aspect of the invention to the BIOS EBDA, four being illustrated in the present example of FIG. 7. Each of these tables is dynamically associated with a logical drive letter. The table provides the translation necessary to map the logical drive to a selected image on the medium. An example of a device table is as follows:

| | | | |
|---|---|---|---|
| SpSize | db | ? | ;set if table active |
| SpMediaType | db | ? | |
| SpDrive | db | ? | ;logical drive |
| SpController | db | ? | |
| SpLba | dd | ? | ;physical location on medium |
| SpLun | db | ? | |
| SpBus | db | ? | |
| SpCacheSegment | dw | ? | |
| SpLoadSegment | dw | ? | |
| SpLoadCount | dw | ? | |
| SpCylinder information | db | ? | ;physical mapping |
| SpSector | db | ? | |
| SpHead | db | ? | |
| TotalSectors | dd | ? | |
| SectCylinder | dw | ? | |
| MediaChange changed | db | ? | ;set if medium has |
| LockCount | db | ? | ;logical media lock |
| BootOffset sector | dw | ? | ;location of boot |
| | dw | ? | ;contains cipher key | wherein the "Sp" prefix designates "specification," db, dw and dd represent byte, word and double word, respectively, and a "?" indicates a reservation in main memory.

Each table describes all the characteristics of a CD-ROM image to be emulated, such as size, media type, and format entities peculiar to hard drive and diskette media. The final entry in the table is a cipher key used in conjunction with file decryption at BIOS level in accordance with the invention, as described later. BIOS, by activating any table per the El-Torito specification (describing only single emulation table implementation) INT 13 Function 4A, can determine which drive is being emulated, and where on the CD-ROM the emulation is to be found.

Figure 8:
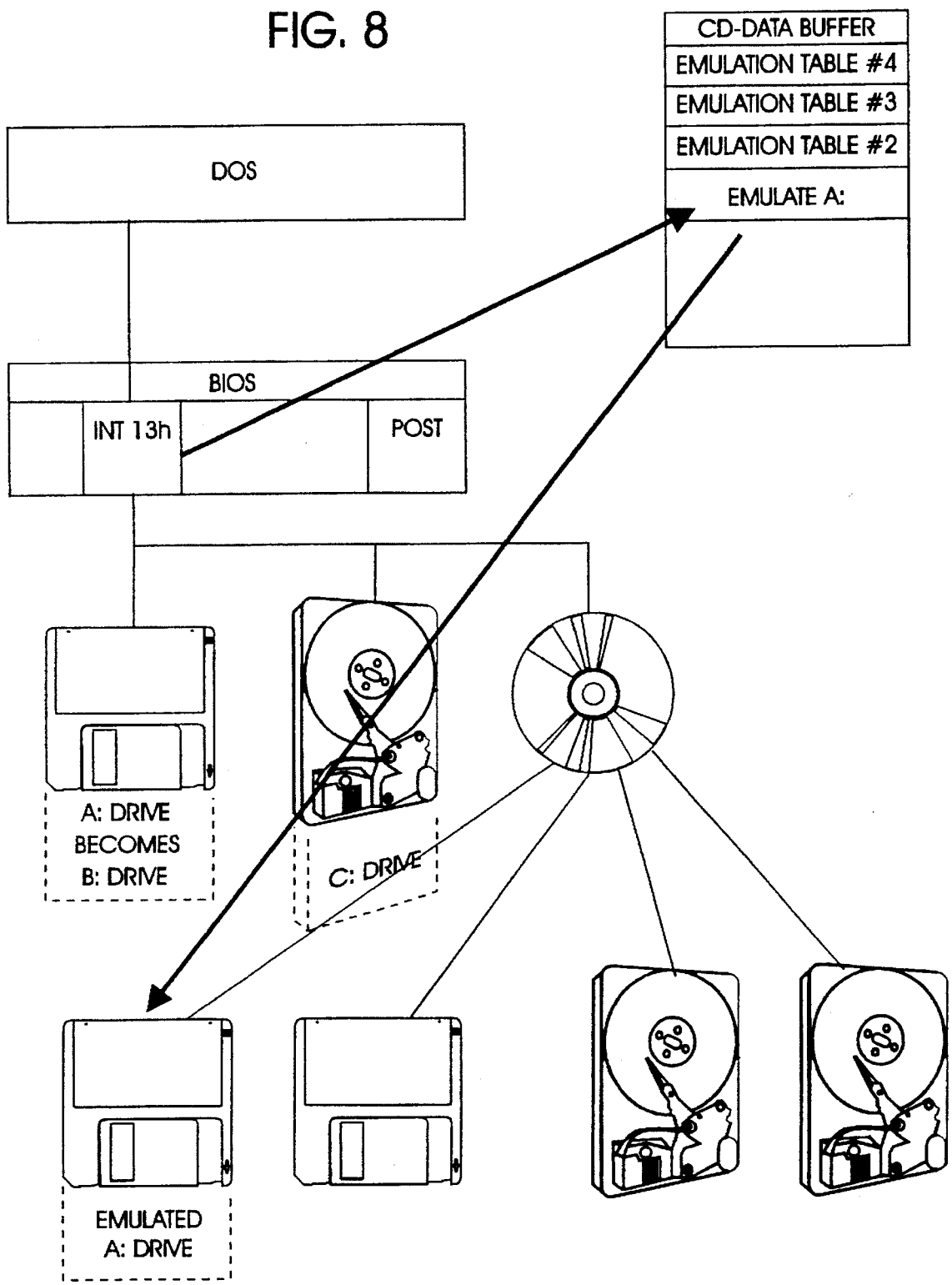
FIG. 8 shows emulation of a CD-ROM image by table activation.
Figure 9:
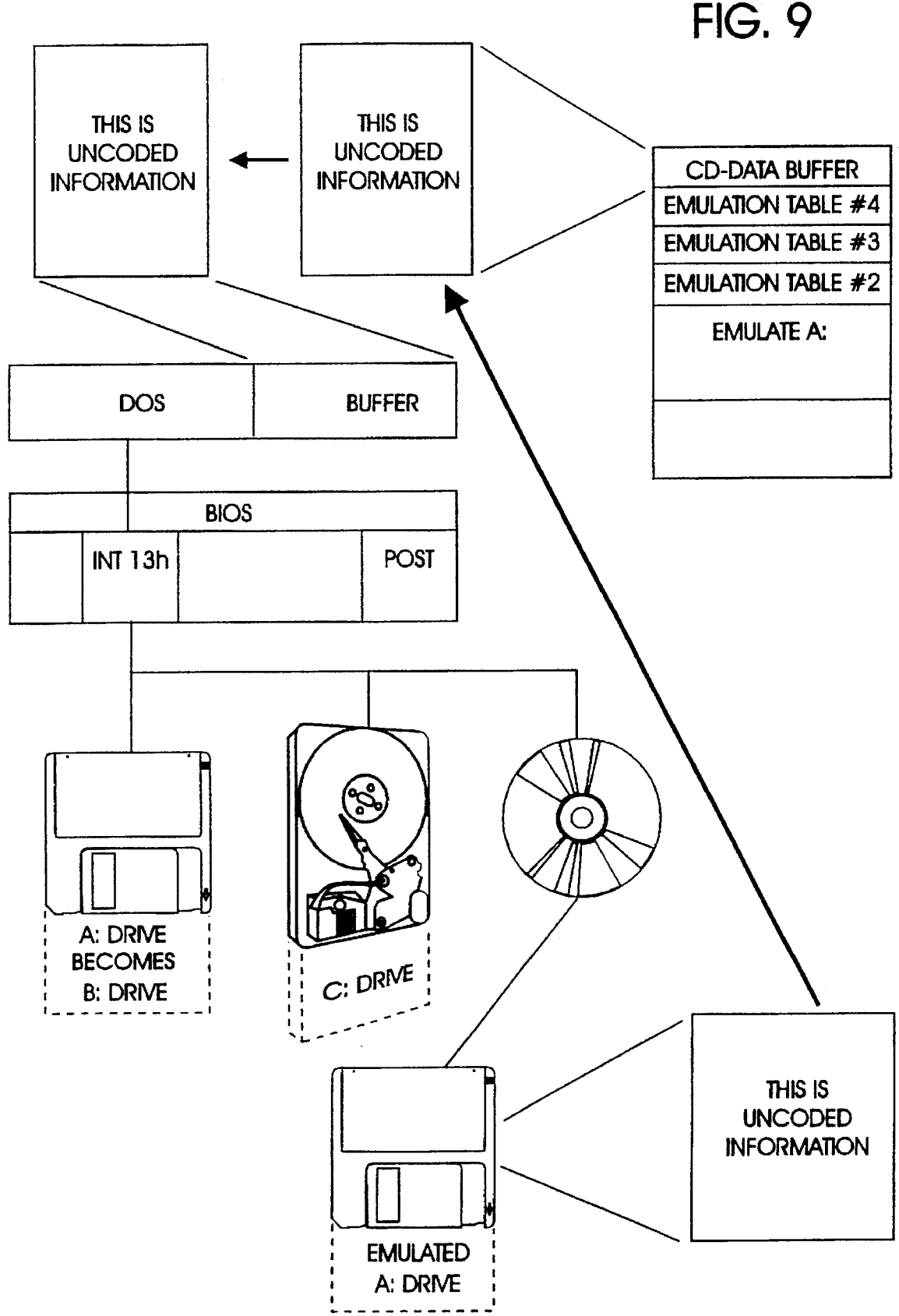
FIG. 9 is a diagram showing flow of data during CD emulation of drive A without decryption of data.

For example, with reference to FIG. 8, emulation of drive A is initiated by activation of the corresponding table by a BIOS call through INT 13, when, as mentioned previously, the physical A drive becomes renamed as the B drive, the A drive having been replaced by the emulation. In FIG. 9, with the A drive emulation remaining active, the BIOS table for emulation B is activated, so that both drive images remain accessible to the user at the same time, without requiring a reboot. In this case a hard drive image emulation replaces the physical B drive which becomes unusable.

Because mass storage media, such as a CD-ROM are capable of storing multiple bootable applications, it is possible to distribute the medium with applications that are not to be accessed by a recipient of the medium as well as with applications that are. For example, a CD-ROM may be distributed bearing an application in multiple computer languages, only one of which the recipient has purchased or licensed for use. Another example is a CD-ROM bearing multiple applications along with different associated operating systems. The invention contemplates distributing at least some of the applications on the mass storage medium in encrypted form, and enabling only an authorized user of an application access through data decryption performed at least in part at the level of BIOS.

Figure 10:
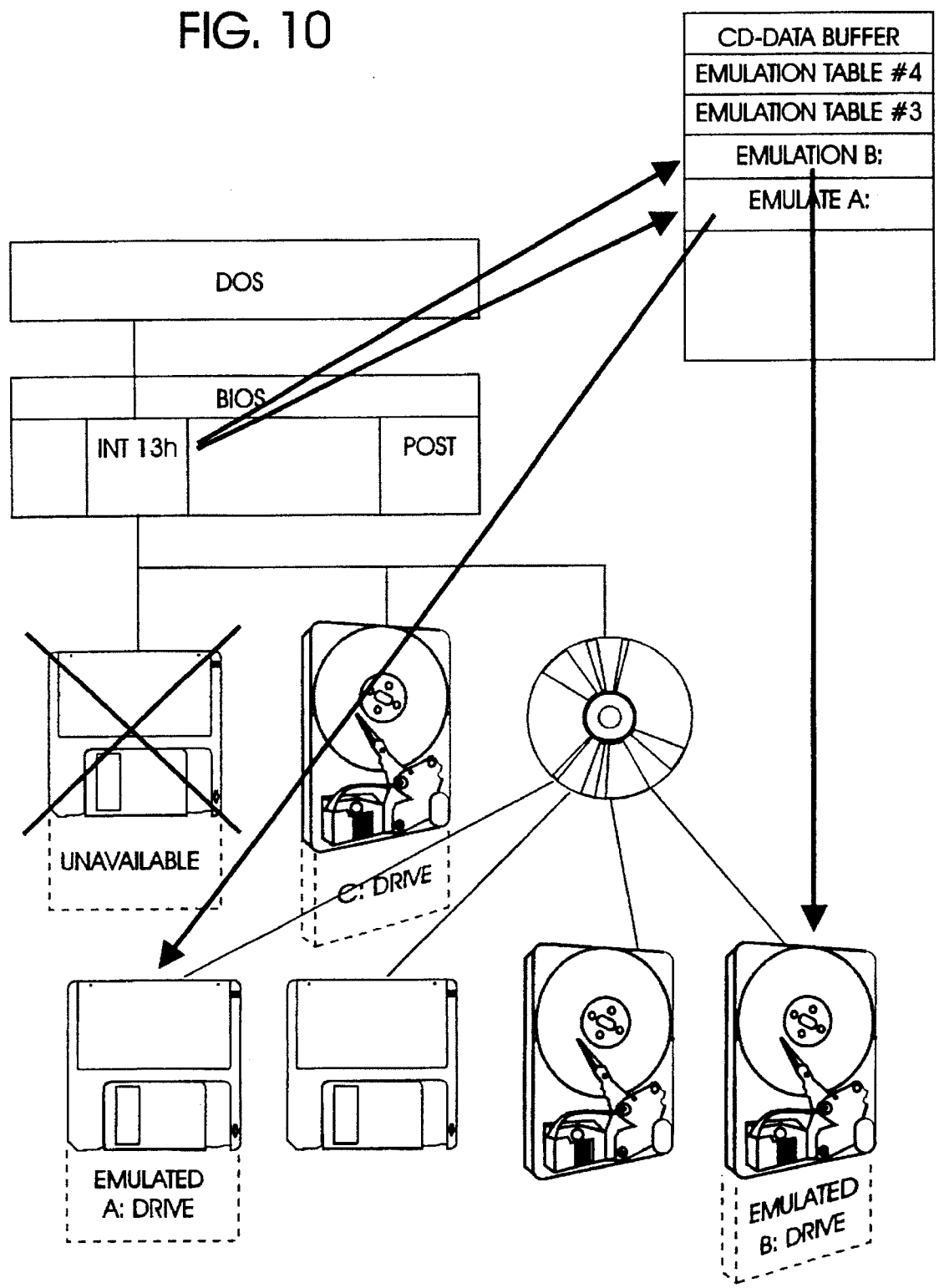
FIG. 10 shows multiple table activation to emulate two drives simultaneously.

Thus, with reference to FIG. 10, assume that file data is being read from an emulated A drive on the CD-ROM and that the physical A drive is renamed as the B drive, as described previously. Assume further that the file is not encrypted, that is, the emulated file represents clear data. The data is sent to the CD data buffer within the BIOS EBDA, and from there transferred to a buffer within the operating system, in this example, DOS. Other buffers may also contain data read from the other emulations, which may represent clear or encrypted data.

Figure 11:
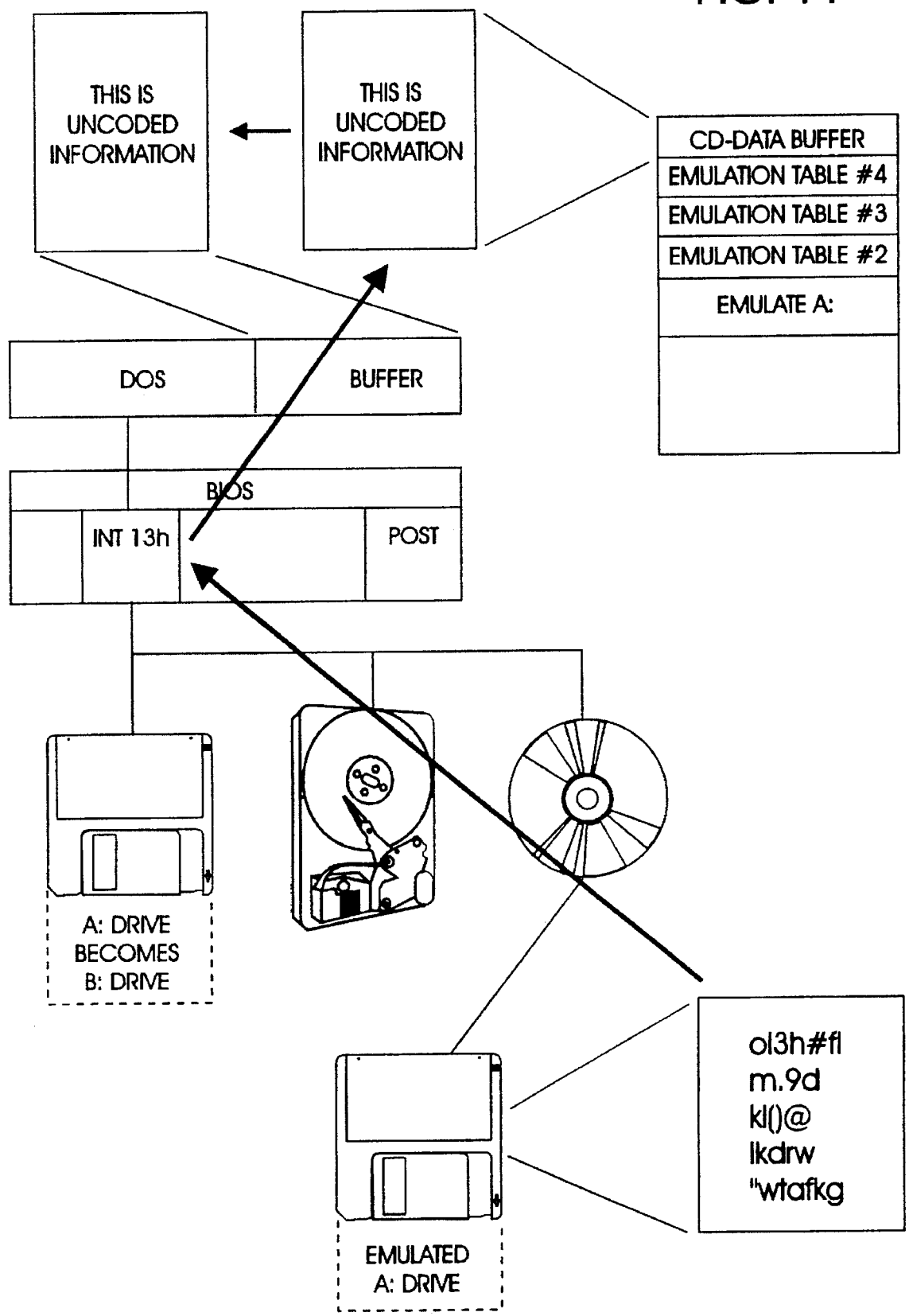
FIG. 11 is a diagram showing flow of data with BIOS decryption of data in accordance with an aspect of the invention.

In FIG. 11, however, the data read from the emulated file in emulated drive A is encrypted, and only an authorized user is permitted access. In this case, encoded data is transferred to BIOS, where it is decrypted in accordance with the invention, and then stored as clear data in the operating system buffer.

Any of a number of data encryption/decryption algorithms can be suitably used in the invention. What is significant is that decryption of data read from file emulations within the context of the multiple boot environment with which the present invention is concerned is carried out at the BIOS level, and hence is independent of the operating system. Another important aspect of the invention resides in the algorithm itself which is particularly secure, and is of a random nature both in its encryption starting point and manipulation so as to be of improved immunity to "code breakers."

Figure 12:
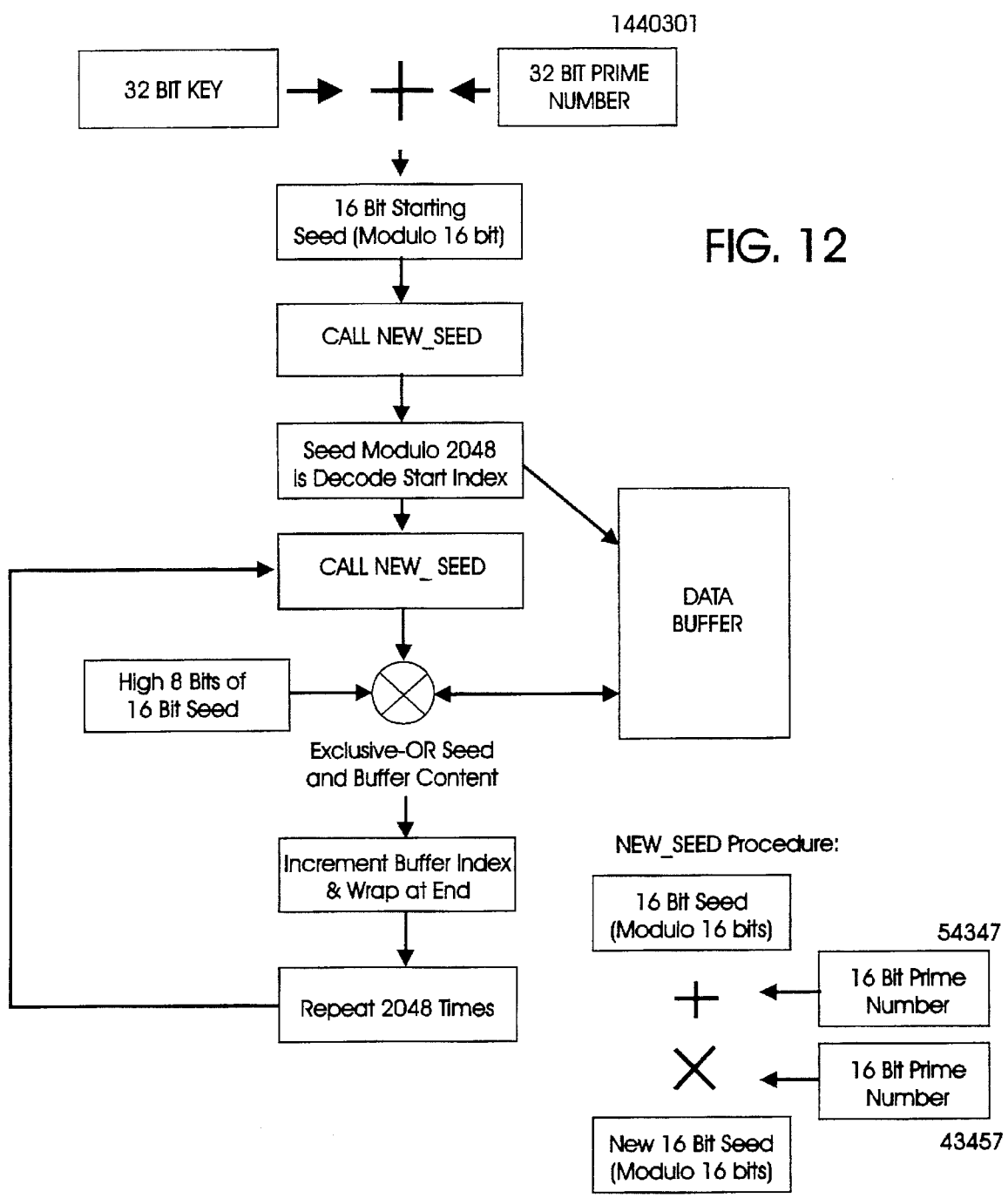
FIG. 12 is a flow chart of a preferred BIOS data decryption algorithm implemented in the invention.

Thus, with reference to FIG. 12, initially a 32 bit starting seed is obtained, either by assignment to the user or by combination of an assigned portion (e.g., personal identification number) with a serial number associated with the computer, among other possibilities. A seed that is as large as possible is preferred from the standpoint of security, and hence in this example a 32 bit length is selected. This 32 bit seed is then folded into a 16 bit seed by adding a 32 bit prime number. 16 bits of the resultant number are selected as a starting seed by multiplication and addition with a 5 digit random number. The seed that results is of modulo the size of a block of encrypted data read from the CD-ROM and stored in the BIOS data buffer. In the present example, the size of a CD-ROM is 2048, and hence, the modulus of the seed is 2048. This seed is used to point to the starting point of the 2048 data block stored in the buffer as earlier discussed in (b) of the decryption algorithm.

An important feature of this algorithm is in the derivation of a random new starting point in the buffer during data decryption, a procedure that considerably complicates decryption by other than a user in possession of the original seed.

Next, a new 16 bit seed derived from the previous one is called, and a random number is generated by exclusive ORing with the high 8 bits of the 16 bit seed, the buffer index is incremented and wrapped around if necessary, and a new seed called. This process in repeated until 2048 bytes of block data are encrypted.

Figure 13:
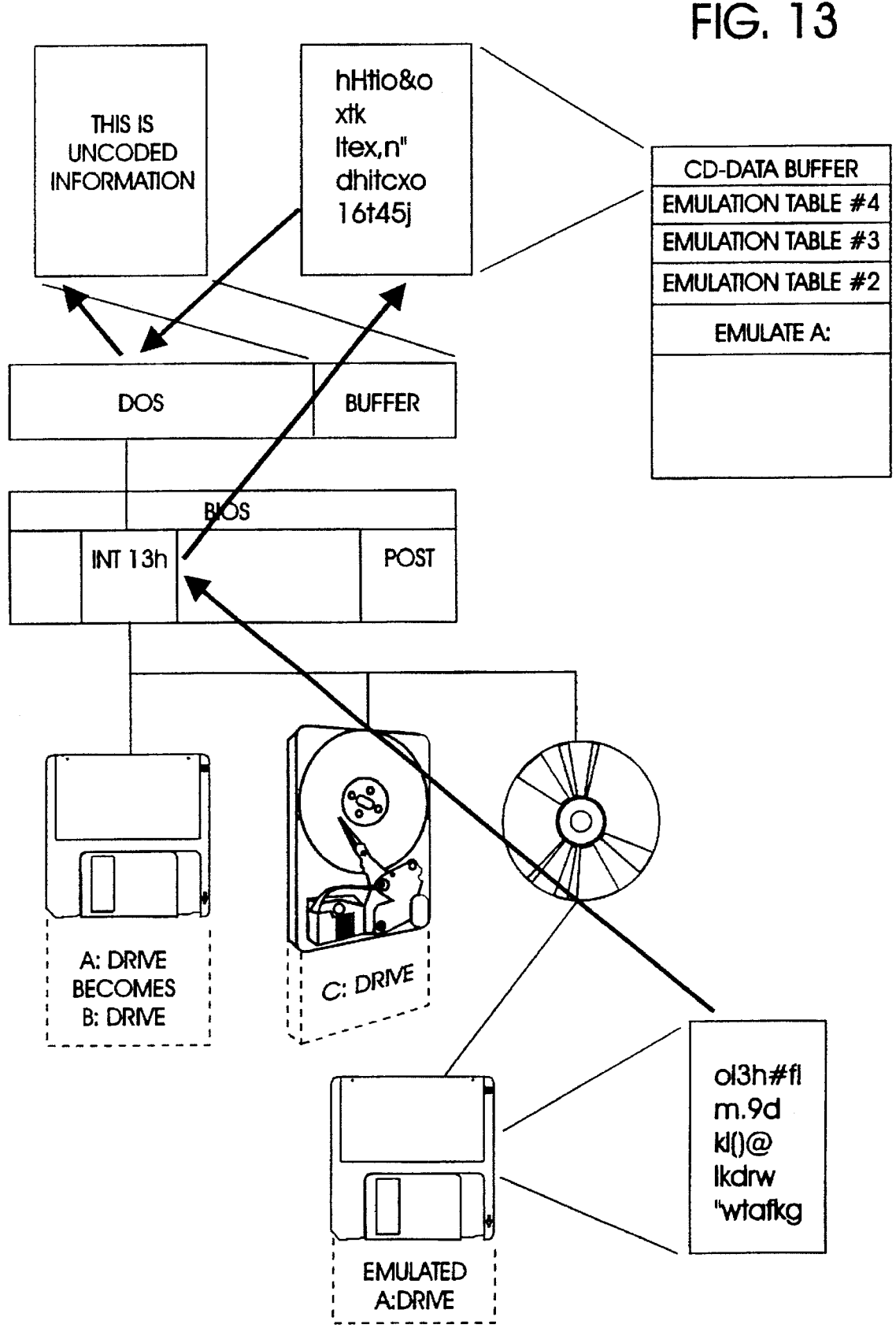
FIG. 13 is a diagram showing flow of data with BIOS and application layer data decryption in accordance with another aspect of the invention.

Another embodiment of the invention, depicted in FIG. 13, performs at BIOS level an initial decryption of data read from the emulated file. However, the data produced by this decryption is not clear, as it must undergo a second decryption this time carried out at the application level. Thus, in the example, the initially decrypted data is read from the CD-data buffer in BIOS EBDA and sent to the operating system buffer where a second level of decryption takes place. The decryption algorithm implemented at this second level of decryption may be the same as that implemented in the BIOS level decryption, or may be another such as the Data Decryption Standard (DES).

There accordingly has been described a bootable CD-ROM operating environment wherein data stored in prescribed image emulations of the CD are encrypted so as to be accessible only to authorized users. Decryption is performed at the BIOS level, or optionally at both the BIOS and application levels. A decryption algorithm implemented in the invention randomizes the starting point for data in the buffer as well as decrypts the data read from it.

In practice, one implementation example may involve an installation utility in a default image on the CD that would not be encrypted. The default image is booted, and the user asked what operating system is requested, and what the key number is. Then a warm boot will optionally take place, when the BIOS carries out the decipher algorithm based on the entered key.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

What is claimed is:

1. A data processing system, comprising:

a central processing unit (CPU);

system memory for storing data in electrical signal form;

first port for receiving an input device generating electrical input signals;

at least one second port for supplying electrical output signals to output devices;

a BIOS circuit included within the CPU for carrying out prescribed functions at the BIOS level including converting operating signals developed by an operating system executed by the CPU into electrical signals compatible with devices that are responsive to signals provided by the CPU;

a non-volatile mass storage CD-ROM medium storing multiple independent applications in the form of encrypted data on respective BIOS emulated images, each emulated image including its own operating system;

a drive for the non-volatile mass storage medium;

a system bus interconnecting the CPU, the system memory, the first and second ports and the drive for the mass storage medium; and the BIOS circuit programmed in accordance with a decryption algorithm for decrypting data from only prescribed emulated images read from the mass storage medium, wherein the decryption algorithm comprises the steps of:

(a) reading a block of data from a region of the prescribed emulated images, (b) applying an encryption key as a seed to a psuedo-random number generator and generating a first pseudorandom number therefrom of modulus equal to the size of the block of data to define a data block starting index of a data buffer, which data buffer has a buffer Start, (c) generating a second pseudorandom number, (d) exclusive ORing the second pseudorandom number with current data at the starting index in the data buffer using the first pseudorandom number, (e) incrementing the data buffer from the starting index, wrapping to the buffer start, if necessary, and (f) repeating steps (c), (d) and (e) until decryption of the block of data is complete.

2. The data processing system of claim 1, wherein the data processing system includes a further decryption algorithm executing at an operating system level for further decrypting the data from the corresponding emulated image read from the CD-ROM mass storage medium.

3. A method of operating a data processing system comprising at least a central processing unit (CPU), input and output ports, a system memory for storing data in the form of electrical signals, a drive for writing data to and reading data from a CD-ROM mass storage medium, wherein data stored in at least one prescribed region of the CD-ROM is encrypted, and a system bus interconnecting the CPU, the input and output ports, the drive and the system memory, the CPU including a BIOS circuit for carrying out prescribed functions including converting operating signals developed by an operating system executed by the CPU into electrical signals compatible with devices that are responsive to signals provided by the CPU to the system bus, the method comprising steps at the BIOS level including:

(a) converting operating signals developed by an operating system executed by the CPU into electrical signals compatible with devices that are responsive to signals provided by the CPU to the system bus, (b) emulating an image from data read from only the at least one prescribed region of the CD-ROM mass storage medium, and (c) decrypting data from the emulated image read by the drive from the CD-ROM mass storage medium comprising the step of executing a decryption algorithm based on a decryption key supplied to a user authorized to read data from the prescribed region of the CD-ROM including the steps of:

(c1) reading a block of data from the prescribed region, (c2) applying an encryption key as a seed to a psuedorandom number generator and generating a first pseudorandom number therefrom of modulus equal to the size of the block of data to define a data block starting index of a data buffer, having a buffer start, (c3) generating a second pseudorandom number, (c4) exclusive ORing the second pseudorandom number with current data at the starting index in the data buffer using the first pseudorandom number, (c5) incrementing the data buffer beginning from the starting index, wrapping to the buffer start, if necessary, and (c6) repeating steps (c3), (c4) and (c5) until decryption of the block of data is complete.

4. The method of claim 3, wherein the method includes the step at an application level of carrying out further decryption of the data read from the prescribed region of the CD-ROM.

\* \* \* \* \*